(12) United States Patent
Tokura et al.

(10) Patent No.: US 7,727,113 B2
(45) Date of Patent: Jun. 1, 2010

(54) CONTROLLER AND CONTROL METHOD OF VEHICLE

(75) Inventors: Takaaki Tokura, Nagoya (JP); Toshio Sugimura, Nagoya (JP); Tomohiro Asami, Nisshin (JP); Nobufusa Kobayashi, Anjo (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 497 days.

(21) Appl. No.: 11/826,404

(22) Filed: Jul. 16, 2007

(65) Prior Publication Data

US 2008/0029063 A1 Feb. 7, 2008

(30) Foreign Application Priority Data

Aug. 1, 2006 (JP) ............................. 2006-209828

(51) Int. Cl.
*B60W 10/06* (2006.01)
*B60W 10/10* (2006.01)
(52) U.S. Cl. .................................................. 477/107
(58) Field of Classification Search ................ 477/110, 477/904
See application file for complete search history.

(56) References Cited

U.S. PATENT DOCUMENTS

| 2001/0021682 | A1* | 9/2001 | Urasawa | 477/3 |
| 2002/0193204 | A1* | 12/2002 | Klosel et al. | 477/107 |
| 2005/0143222 | A1* | 6/2005 | Shim | 477/107 |

FOREIGN PATENT DOCUMENTS

| JP | 3280976 | 2/2002 |
| JP | 2004-316838 | 11/2004 |
| WO | WO 93/16303 | 8/1993 |

* cited by examiner

*Primary Examiner*—Sherry L Estremsky
*Assistant Examiner*—Edwin A. Young
(74) *Attorney, Agent, or Firm*—Finnegan, Henderson, Farabow, Garrett & Dunner, LLP

(57) ABSTRACT

An ECU executes a program sets a driver requested torque based on the accelerator operation amount, and sets a torque-boost amount so that the torque-boost amount increases as the driver requested torque increases, until the driver requested torque exceeds a predetermined torque T(0). When the driver requested torque exceeds the predetermined torque T(0), the torque-boost amount decreases as the driver requested torque increases. However, the torque obtained by adding the torque-boost amount to the driver requested torque increases as the accelerator operation amount increases.

3 Claims, 9 Drawing Sheets

FIG.3

|      | C1 | C2 | B1 | B2 | B3 | F |
|------|----|----|----|----|----|---|
| 1ST  | O  | ×  | ×  | ◎  | ×  | △ |
| 2ND  | O  | ×  | O  | ×  | ×  | × |
| 3RD  | O  | ×  | ×  | ×  | O  | × |
| 4TH  | O  | O  | ×  | ×  | ×  | × |
| 5TH  | ×  | O  | ×  | ×  | O  | × |
| 6TH  | ×  | O  | O  | ×  | ×  | × |
| R    | ×  | ×  | ×  | O  | O  | × |
| N    | ×  | ×  | ×  | ×  | ×  | × |

O ENGAGED
× RELEASED
◎ ENGAGED FOR ENGINE BRAKING
△ ENGAGED ONLY WHEN DRIVEN

CONTROLLER AND CONTROL METHOD OF VEHICLE

INCORPORATION BY REFERENCE

The disclosure of Japanese Patent Application No. 2006-209828 filed on Aug. 1, 2006, including the specification, drawings and abstract, is incorporated herein by reference in its entirety.

BACKGROUND OF THE INVENTION

1. Field of Invention

The invention relates to a control device and a method of controlling a vehicle. In particular, the invention relates to a technology of performing a torque-boost increase control of a power source during a torque phase of an upshift when causing an automatic transmission to upshift.

2. Description of Related Art

It is known that when an automatic transmission upshifts, the drive force is dropped (is reduced) during the torque phase; the drive force increases during the transition from the torque phase to the inertia phase, thereby generating a torque shock. To suppress such a shock during a shift, one solution is to boost the torque-boost during the torque phase.

Japanese Patent Application Publication No. JP-A-2004-316838 describes a shift control device of an automatic transmission that boosts the torque from a power source in order to cause the gear shift to progress as planned. This shift control device includes: a power source torque upper limit calculator that determines the torque upper limit of the torque that can be generated by the power source during a gear shift at the time of command of the gear shift, a power source torque-boost calculator that determines the torque generation demanded of the power source when the torque is boosted at the time of the gear shift command, a target engaging force setting section that sets a target engaging force of a shift-purpose friction element that is to be changed in state, at the time of the shift on the basis of the power source torque upper limit if it is determined that the torque-boost-time power source torque exceeds the power source torque upper limit, a power source torque control portion that controls the power source during the shift so that the output torque becomes equal to the torque upper limit, if the torque-boost-time power source torque exceeds the power source torque upper limit, and a friction element fastening control portion that controls the fastening of the shift-purpose friction element during the shift so that the engaging force becomes equal to the target engaging force, if the power source torque-boost exceeds the power source torque upper limit.

According to the shift control device described in JP-A-2004-316838, an insufficient torque-boost due to the torque upper limit of the power source is compensated for by correcting the engaging force of the friction element, and this correction is performed through a feed-forward control. Therefore, even though the object of correction is the engaging force of the friction element, the problems related to the low response in the case where the control is through a feed-back control do not occur, and the height of the output torque step immediately following the torque phase during the shift can be made small.

When the accelerator operation amount is large and the power source is operating under a high load, the intake air amount cannot easily be increased even if the degree of throttle opening is enlarged. Therefore, the torque is not easily increased even in response to a torque-boost command. Therefore, if the control mode during a shift is changed in response to the torque of the power source exceeding the upper limit value as in the shift control device described in Japanese Patent Application Publication No. JP-A-2004-316838, the control mode during a shift can suddenly change at a certain accelerator operation amount. In such a case, discomfort can be caused to the driver.

SUMMARY OF THE INVENTION

The invention provides a controller of a vehicle that reduces the discomfort that may be caused to a driver during a shift of an automatic transmission.

A first aspect of the invention relates to a controller of a vehicle. The controller of the vehicle controls a vehicle that has a power source, and an automatic transmission that is coupled to the power source and that establishes a plurality of gear steps of different gear ratios by selectively engaging a plurality of friction engagement elements. This controller includes control means for controlling the power source when the automatic transmission upshifts so that a torque-boost control of the power source is performed during the torque phase of the upshift, and setting means for setting a torque-boost amount in the torque-boost control during the torque phase based on a driver requested output amount. The setting means includes means for setting the torque-boost amount so that the torque-boost amount increases as the driver requested output amount increases until the driver requested output amount exceeds a predetermined value. Once the driver requested output amount exceeds the predetermined value, the torque-boost amount decreases as the driver requested output amount increases. However, and the total torque obtained by adding the torque-boost amount to a requested torque, which corresponds to the driver requested output amount, is increased as the driver requested output amount increases.

According to the controller of the vehicle in the first aspect of the invention, when the automatic transmission upshifts, the power source is controlled so that the torque-boost control of the power source is performed during the torque phase of the upshift. The torque-boost amount in the torque-boost control during the torque phase is set on the basis of the driver requested output amount (e.g., the driver requested torque or the accelerator operation amount). The torque-boost amount is set so that the torque-boost amount increases as the requested output amount increases, until the requested output amount exceeds a predetermined value. When the requested output amount exceeds the predetermined value, the torque-boost amount decreases even as the requested output amount continues to increase, and a torque obtained by adding the torque-boost amount to the requested torque corresponding to the requested output amount increases as the requested output amount increases. Therefore, when the driver requested output amount is small, so that the torque-boost can be sufficiently carried out, the torque-boost amount can be made larger the larger the requested output amount is. As there approaches a state in which the driver requested output amount is large so that the torque-boost cannot be sufficiently carried out, the torque-boost amount is gradually decreased. During this time, as the requested output amount increases, the torque obtained by adding the torque-boost amount to the requested torque that corresponds to the requested output amount increases. Therefore, it is possible to output a torque that corresponds to the driver requested output amount while restraining sudden changes in the control mode, such as a sudden change in which the torque-boost control of the engine suddenly ceases. As a result, it is possible to provide a controller of a vehicle that is able to reduce the discomfort that may be caused to the driver during a shift of the automatic transmission.

The controller of the vehicle of the first aspect of the invention may further include means for setting the requested torque-boost amount so that the requested torque-boost amount for raising the torque of the power source is gradually increased to the torque-boost amount during the torque phase of the upshift.

According to this construction, in the torque-boost control, the power source is controlled so that the torque is increased by the requested torque-boost amount. The requested torque-boost amount is set so as to gradually increase to the torque-boost amount during the torque phase of the upshift. The amount of drop in the drive force during the torque phase becomes greater as the shift progresses. Therefore, it is preferable that the torque of the power source gradually increase. Incidentally, the torque that is output from the power source in response to the requested torque-boost amount has a response delay. However, since the requested torque-boost amount is set so as to gradually increase to the torque-boost amount during the torque phase of the upshift, the torque-boost amount can be set relatively high, taking into account the response delay of the actually output torque. Due to this, the torque that is actually output from the power source can be brought close to an ideal torque waveform. Therefore, the torque of the power source at the time of start of the inertia phase can be brought close to an ideal torque. As a result, the engagement pressures of the friction engagement elements, and the like, which need to be controlled in accordance with the torque of the power source at the time of start of the inertia phase can easily be controlled.

A second aspect of the invention relates to a control method of a vehicle. The control method of the vehicle relates to a control method of a vehicle a power source, and an automatic transmission that is coupled to the power source and that establishes a plurality of gear steps of different gear ratios by selectively engaging a plurality of friction engagement elements. The control method of the vehicle includes: controlling the power source so that, at a time of an upshift of the automatic transmission, a torque-boost control of the power source is performed during the torque phase of the upshift, and increasing a torque-boost amount as a driver requested output amount increases in the torque-boost control until the driver requested output exceeds a predetermined value; and decreasing the torque-boost amount as the driver requested output amount increases when the driver requested output amount exceeds the predetermined value; wherein a torque obtained by adding the torque-boost amount to a requested torque, which corresponds to the driver requested output amount, is increased as the driver requested output amount increases.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 3 shows an operation table of the automatic transmission;

DETAILED DESCRIPTION OF THE PREFERRED EMBODIMENTS

Figure 1:
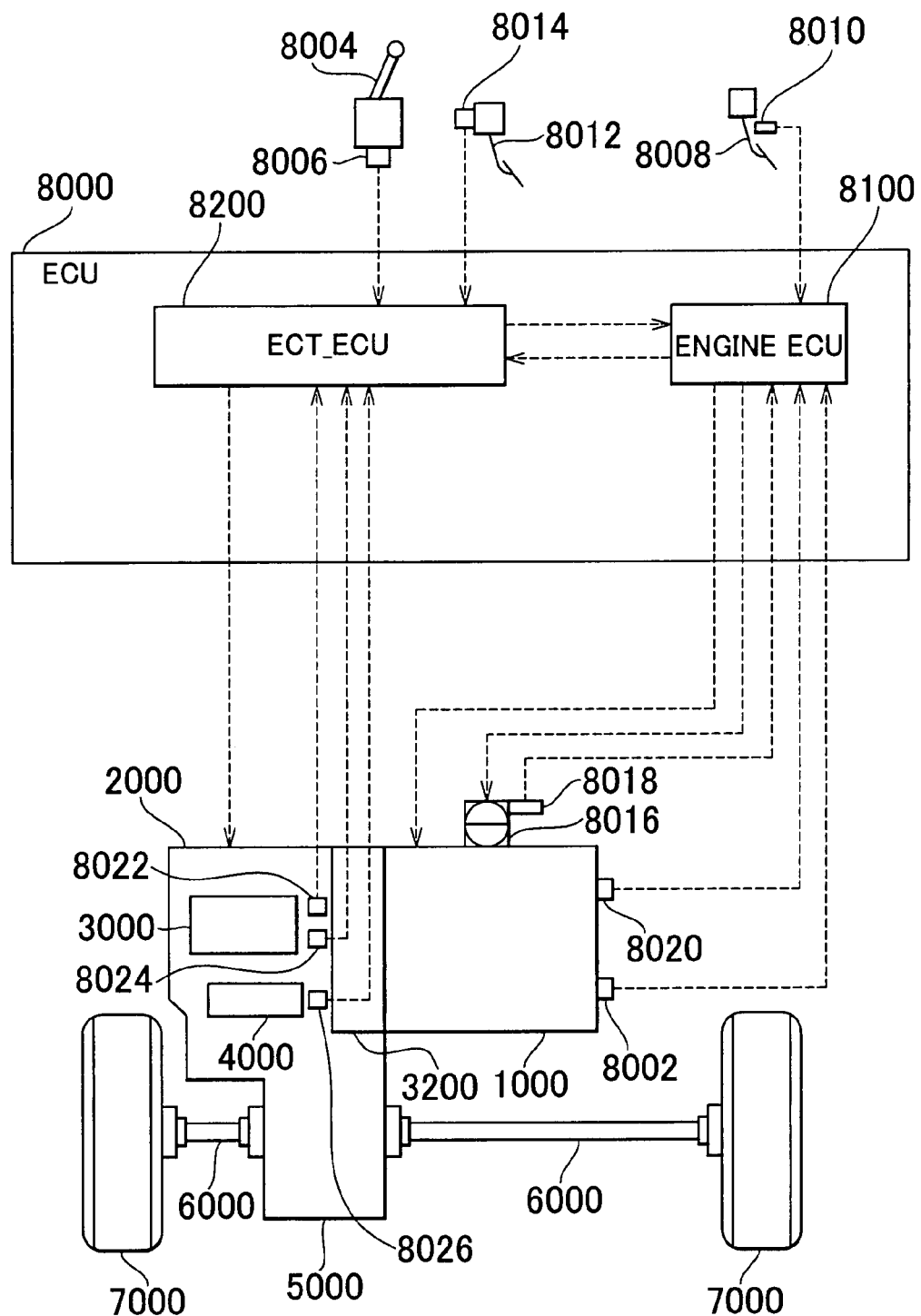
FIG. 1 is a schematic construction diagram showing the powertrain of a vehicle.

Hereinafter, embodiments of the invention will be described with reference to the drawings. In the foregoing description, the same reference characters are affixed to the same component parts. The names and functions thereof are the same. Therefore, detailed descriptions thereof will not be repeated.

With reference to FIG. 1, a vehicle equipped with a controller in accordance with an embodiment of the invention will be described. This vehicle is an FF (front engine, front drive) vehicle. However, the vehicle may have a configuration other than the FF vehicle.

The vehicle includes an engine 1000, an automatic transmission 2000, a planetary gear unit 3000 that constitutes a portion of the automatic transmission 2000, a hydraulic circuit 4000 that constitutes a portion of the automatic transmission 2000, a differential gear 5000, a drive shaft 6000, front wheels 7000, and an ECU (Electronic Control Unit) 8000. The controller in accordance with the embodiment may be implemented, for example, by executing a program stored in a ROM (Read Only Memory) of the ECU 8000.

The engine 1000 is an internal combustion engine that burns a mixture of air and fuel injected from an injector (not shown) in a combustion chamber of a cylinder. Due to the combustion, the piston in the cylinder is pushed down, thus rotating a crankshaft. An electric motor may also be used as a power source, instead of or in addition to the engine 1000.

The automatic transmission 2000 is coupled to the engine 1000 via a torque converter 3200. The automatic transmission 2000 changes the rotational speed of the crankshaft to a desired rotational speed by forming a desired gear step.

An output gear of the automatic transmission 2000 meshes with the differential gear 5000. Drive shafts 6000 are coupled to the differential gear 5000 by spline fitting or the like. Power is transmitted to the left and right front wheels 7000 via the drive shafts 6000.

The ECU 8000 is connected with a coolant temperature sensor 8002, a position switch 8006 of a shift lever 8004, an accelerator operation amount sensor 8010 of an accelerator pedal 8008, a depression force sensor 8014 of a brake pedal 8012, a throttle opening degree sensor 8018 of an electronic throttle valve 8016, an engine rotation speed sensor 8020, an input shaft rotation speed sensor 8022, an output shaft rotation speed sensor 8024, and an oil temperature sensor 8026, via a wire harness or the like.

The coolant temperature sensor 8002 detects the temperature of coolant (hereinafter, "coolant temperature") of the engine 1000, and sends a signal indicating the detected temperature to the ECU 8000. The position of the shift lever 8004 is detected by the position switch 8006, which sends a signal indicating the detected position to the ECU 8000. The gear step of the automatic transmission 2000 is automatically formed in response to the position of the shift lever 8004. Additionally, a construction that allows the selection of a manual shift mode, in which a driver can select a desired gear step in accordance with the driver operation, may also be provided.

The accelerator operation amount sensor 8010 detects the degree of operation of the accelerator pedal 8008, and sends a signal indicating the detected degree of operation to the ECU 8000. The depression force sensor 8014 detects the depression force on the brake pedal 8012 (i.e., the force with which the driver depresses the brake pedal 8012), and sends a signal indicating the detected depression force to the ECU 8000.

The throttle opening degree sensor 8018 detects the degree of opening of the electronic throttle valve 8016, which is adjusted by an actuator, and sends a signal indicating the detected degree of opening to the ECU 8000. The amount of air taken into the engine 1000 (i.e., the output of the engine 1000) may be adjusted by the electronic throttle valve 8016.

Incidentally, the amount of air taken into the engine 1000 may be adjusted by changing the amounts of lift or duration of intake valves (not shown) and exhaust valves (not shown), instead of or in addition to using the electronic throttle valve 8016.

The engine rotation speed sensor 8020 detects the rotational speed of the output shaft (crankshaft) of the engine 1000, and sends a signal indicating the detected rotational speed of the output shaft to the ECU 8000. The input shaft rotation speed sensor 8022 detects the input shaft rotational speed NI of the automatic transmission 2000 (the turbine rotational speed NT of the torque converter 3200), and sends a signal indicating the detected rotational speed NI to the ECU 8000. The output shaft rotation speed sensor 8024 detects the output shaft rotational speed NO of the automatic transmission 2000, and sends a signal indicating the detected rotational speed NO to the ECU 8000.

The oil temperature sensor 8026 detects the temperature (oil temperature) of the oil used for operation and lubrication of the automatic transmission 2000 (ATF, Automatic Transmission Fluid), and sends a signal indicating the detected oil temperature to the ECU 8000.

The ECU 8000 controls various mechanisms so that the vehicle achieves a desired running condition, based on the signals from the coolant temperature sensor 8002, the position switch 8006, the accelerator operation amount sensor 8010, the depression force sensor 8014, the throttle opening degree sensor 8018, the engine rotation speed sensor 8020, the input shaft rotation speed sensor 8022, the output shaft rotation speed sensor 8024, the oil temperature sensor 8026, etc., and the maps and programs stored in the ROM (Read-Only Memory).

In the embodiment, if the shift lever 8004 is in the D (drive) position, thereby selecting the D shift range of the automatic transmission 2000, the ECU 8000 controls the automatic transmission 2000 to select one of the first to sixth-speed gear steps, as appropriate. By selecting one of the first to sixth-speed gear steps, the automatic transmission 2000 is able to transmit drive force to the front wheels 7000. It is also possible to employ a construction that provides a higher speed gear step than the sixth-speed gear step, that is, a seventh-speed gear step or an eighth-speed gear step, in the D range. The gear step to be selected is determined on the basis of a shift chart created beforehand through experiments or the like using the vehicle speed and the accelerator operation amount as parameters.

As shown in FIG. 1, the ECU 8000 includes an engine ECU 8100 that controls the engine 1000, and an electronically controlled transmission ECU (ECT-ECU) 8200 that controls the automatic transmission 2000.

The engine ECU 8100 and the ECT-ECU 8200 are send signals to and receive signals from each other. In this embodiment, the engine ECU 8100 sends a signal indicating the accelerator operation amount and a signal indicating the coolant temperature of the engine 1000 to the ECT-ECU 8200. The ECT-ECU 8200 sends to the engine ECU 8100 a signal indicating the requested torque amount determined as a torque that the engine 1000 is required to output.

Figure 2:
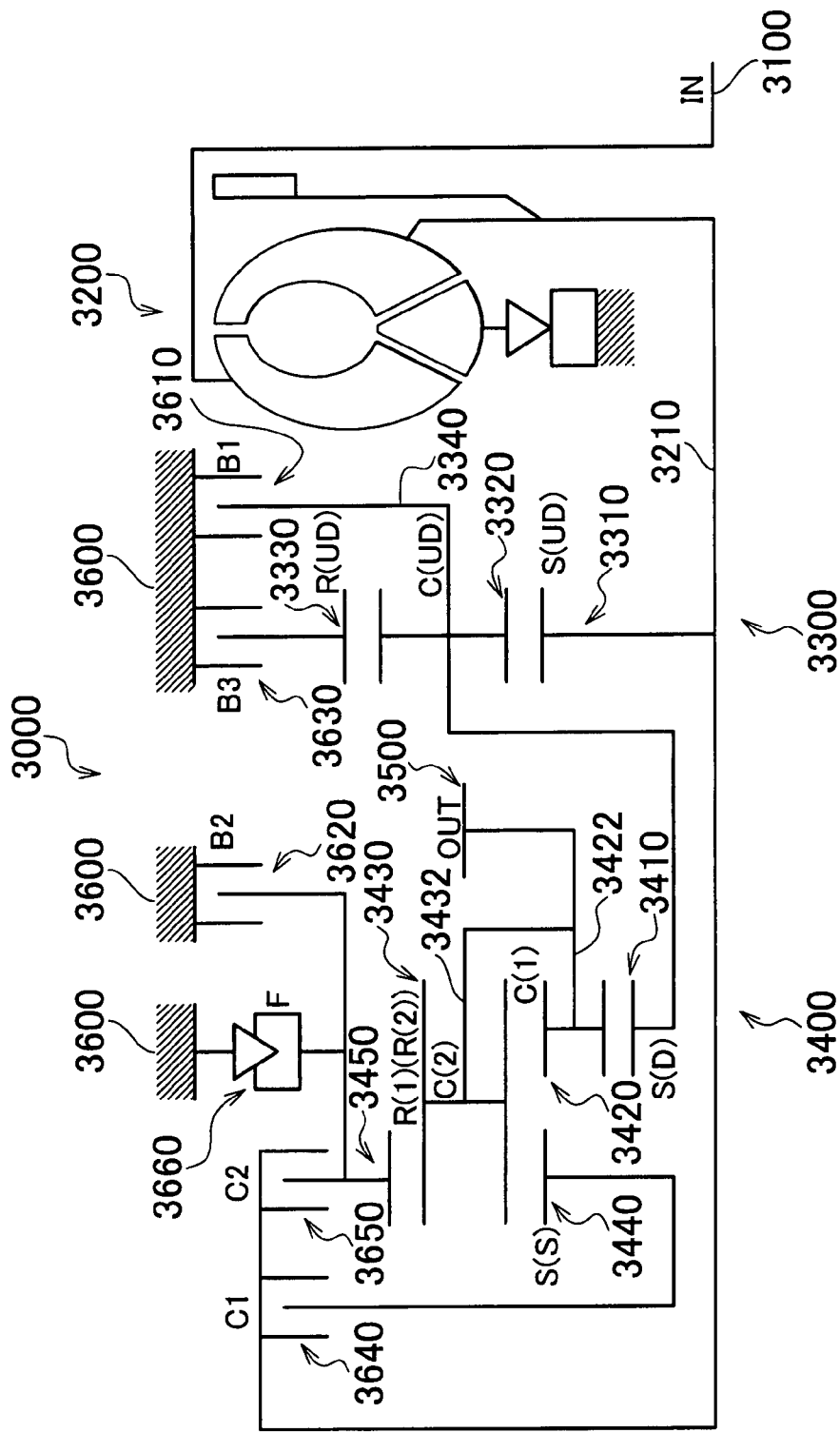
FIG. 2 is a skeleton diagram showing a planetary gear unit of an automatic transmission.

Referring to FIG. 2, the planetary gear unit 3000 will be described. The planetary gear unit 3000 is connected to the torque converter 3200. The torque converter 3200 has an input shaft 3100 that is coupled to the crankshaft. The planetary gear unit 3000 includes a first set 3300 of a planetary gear mechanism, a second set 3400 of a planetary gear mechanism, an output gear 3500, and a B1 brake 3610, a B2 brake 3620 and a B3 brake 3630 that are fixed to a gear case 3600, as well as a C1 clutch 3640, a C2 clutch 3650 and a one-way clutch F 3660.

The first set 3300 is a single-pinion type planetary gear mechanism. The first set 3300 includes a sun gear S(UD) 3310, pinions 3320, a ring gear R(UD) 3330, and a carrier C(UD) 3340.

The sun gear S(UD) 3310 is coupled to the output shaft 3210 of the torque converter 3200. The pinions 3320 are rotatably supported on the carrier C(UD) 3340. The pinions 3320 are meshed with the sun gear S(UD) 3310 and the ring gear R(UD) 3330.

The ring gear R(UD) 3330 is fixable to the gear case 3600 via the B3 brake 3630. The carrier C(UD) 3340 is fixable to the gear case 3600 via the B1 brake 3610.

The second set 3400 is a Ravigneaux type planetary gear mechanism. The second set 3400 includes a sun gear S(D) 3410, short pinions 3420, a carrier C(1) 3422, long pinions 3430, a carrier C(2) 3432, a sun gear S(S) 3440, and a ring gear R(1) (R(2)) 3450.

The sun gear S(D) 3410 is coupled to the carrier C(UD) 3340. The short pinions 3420 are rotatably supported on the carrier C(1) 3422. The short pinions 3420 are meshed with the sun gear S(D) 3410 and the long pinions 3430. The carrier C(1) 3422 is coupled to the output gear 3500.

The long pinions 3430 are rotatably supported on the carrier C(2) 3432. The long pinions 3430 are meshed with the short pinions 3420, the sun gear S(S) 3440 and the ring gear R(1) (R(2)) 3450. The carrier C(2) 3432 is coupled to the output gear 3500.

The sun gear S(S) 3440 is coupled to the output shaft 3210 of the torque converter 3200 via the C1 clutch 3640. The ring gear R(1) (R(2)) 3450 is fixed to the gear case 3600 via the B2 brake 3620, and is coupled to the output shaft 3210 of the torque converter 3200 via the C2 clutch 3650. Furthermore, the ring gear R(1) (R(2)) 3450 is coupled to the one-way clutch F 3660, and becomes unrotatable at the time of driving at the first-speed gear step.

The one-way clutch F 3660 is provided in parallel with the B2 brake 3620. That is, an outer race of the one-way clutch F 3660 is fixed to the gear case 3600, and an inner race thereof is coupled to the ring gear R(1) (R(2)) 3450 via a rotation shaft.

FIG. 3 shows an operation table showing relationships between each gear step and the operational state of the clutches and the brakes. By operating the brakes and the clutches in the combinations shown in the operation table, the first to sixth-speed forward travel gear steps and a reverse travel gear step are formed.

Figure 4:
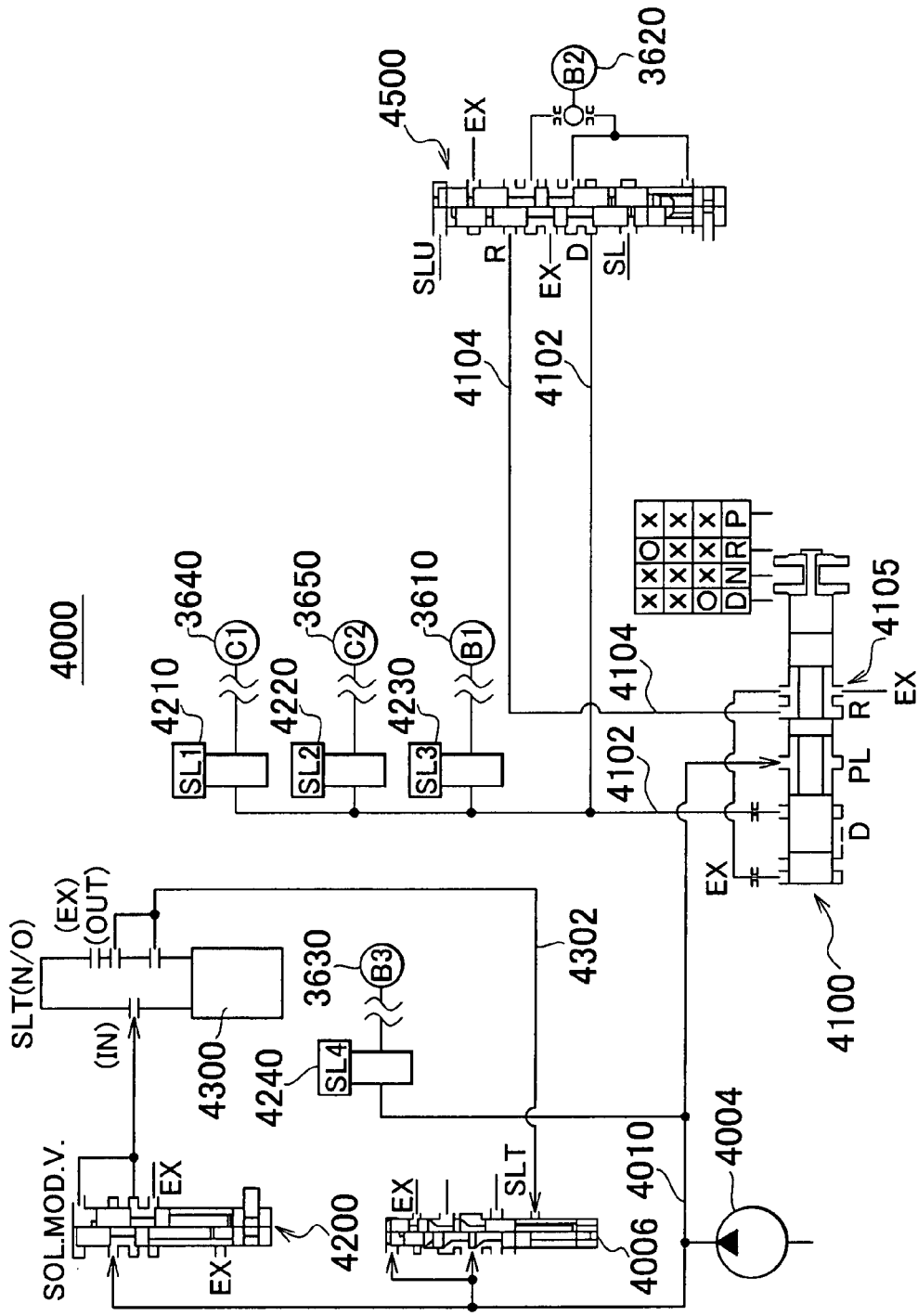
FIG. 4 is a diagram showing a hydraulic circuit of the automatic transmission.

With reference to FIG. 4, portions of the hydraulic circuit 4000 will be described. The hydraulic circuit 4000 is not limited as described follows.

The hydraulic circuit 4000 includes an oil pump 4004, a primary regulator valve 4006, a manual valve 4100, a solenoid modulator valve 4200, an SL1 linear solenoid (hereinafter, referred to as "SL(1)") 4210, an SL2 linear solenoid (hereinafter, referred to as "SL(2)") 4220, an SL3 linear solenoid (hereinafter, referred to as "SL(3)") 4230, an SL4 linear solenoid (hereinafter, referred to as "SL(4)") 4240, an SLT linear solenoid (hereinafter, referred to as "SLT") 4300, and a B2 control valve 4500.

The oil pump 4004 is coupled to the crankshaft of the engine 1000. The rotation of the crankshaft drives the oil pump 4004 and generates oil pressure. The oil pressure generated by the oil pump 4004 is regulated by the primary regulator valve 4006 to produce a line pressure.

The primary regulator valve 4006 operates using, as a pilot pressure, the throttle pressure regulated by the SLT 4300. The line pressure is supplied to the manual valve 4100 via a line pressure oil passageway 4010.

The manual valve 4100 includes a drain port 4105. The oil pressure of a D-range pressurized oil passageway 4102 or an R-range pressurized oil passageway 4104 is discharged from the drain port 4105. If the spool of the manual valve 4100 is in the D position, the line pressure oil passageway 4010 and the D-range pressurized oil passageway 4102 become communicably connected, so that the oil pressure is supplied into the D-range pressure oil passageway 4102. When this occurs, the R-range pressure oil passageway 4104 and the drain port 4105 become communicably connected, so that the R-range pressure of the R-range pressure oil passageway 4104 is discharged from the drain port 4105.

If the spool of the manual valve 4100 is in an R position, the line pressure oil passageway 4010 and the R-range pressure oil passageway 4104 become communicably connected, so that the oil pressure is supplied to the R-range pressure oil passageway 4104. When this occurs, the D-range pressure oil passageway 4102 and the drain port 4105 become communicably connected, so that the D-range pressure of the D-range pressure oil passageway 4102 is discharged from the drain port 4105.

If the spool of the manual valve 4100 is in an N position, both the D-range pressure oil passageway 4102 and the R-range pressure oil passageway 4104 become communicably connected with the drain port 4105, so that the D-range pressure of the D-range pressure oil passageway 4102 and the R-range pressure of the R-range pressure oil passageway 4104 are discharged from the drain port 4105.

The oil pressure supplied into the D-range pressure oil passageway 4102 is eventually supplied to the B1 brake 3610, the B2 brake 3620, the C1 clutch 3640, and the C2 clutch 3650. The oil pressure supplied into the R-range pressure oil passageway 4104 is eventually supplied to the B2 brake 3620.

The solenoid modulator valve 4200 regulates the oil pressure to be supplied to the SLT 4300 (solenoid modulator pressure) to a constant pressure by using the line pressure as the base pressure.

The SL(1) 4210 regulates the oil pressure supplied to the C1 clutch 3640. The SL(2) 4220 regulates the oil pressure supplied to the C2 clutch 3650. The SL(3) 4230 regulates the oil pressure supplied to the B1 brake 3610. The SL(4) 4240 regulates the oil pressure supplied to the B3 brake 3630.

The SLT 4300 produces the throttle pressure by regulating the solenoid modulator pressure in accordance with a control signal from the ECU 8000 on the basis of the accelerator operation amount detected by the accelerator operation amount sensor 8010. The throttle pressure is supplied to the primary regulator valve 4006 via an SLT oil passageway 4302. The throttle pressure is used as the pilot pressure of the primary regulator valve 4006.

The SL(1) 4210, the SL(2) 4220, the SL(3) 4230, the SL(4) 4240 and the SLT 4300 are controlled by control signals sent from the ECU 8000.

The B2 control valve 4500 selectively supplies the oil pressure from one of the D-range pressure oil passageway 4102 or the R-range pressure oil passageway 4104 to the B2 brake 3620. The D-range pressure oil passageway 4102 and the R-range pressure oil passageway 4104 are connected to the B2 control valve 4500. The B2 control valve 4500 is controlled by the oil pressure supplied from an SL solenoid valve (not shown) and an SLU solenoid valve (not shown) and the impelling force of a spring.

When the SL solenoid valve is off and the SLU solenoid valve is on, the B2 control valve 4500 is in the condition shown on the left side in FIG. 4. In this case, the B2 brake 3620 is supplied with the oil pressure obtained by regulating the D-range pressure through the use of the oil pressure supplied from the SLU solenoid valve as a pilot pressure.

When the SL solenoid valve is on and the SLU solenoid valve is off, the B2 control valve 4500 is in the condition shown on the right side in FIG. 4. In this case, the B2 brake 3620 is supplied with the R-range pressure.

Figure 5:
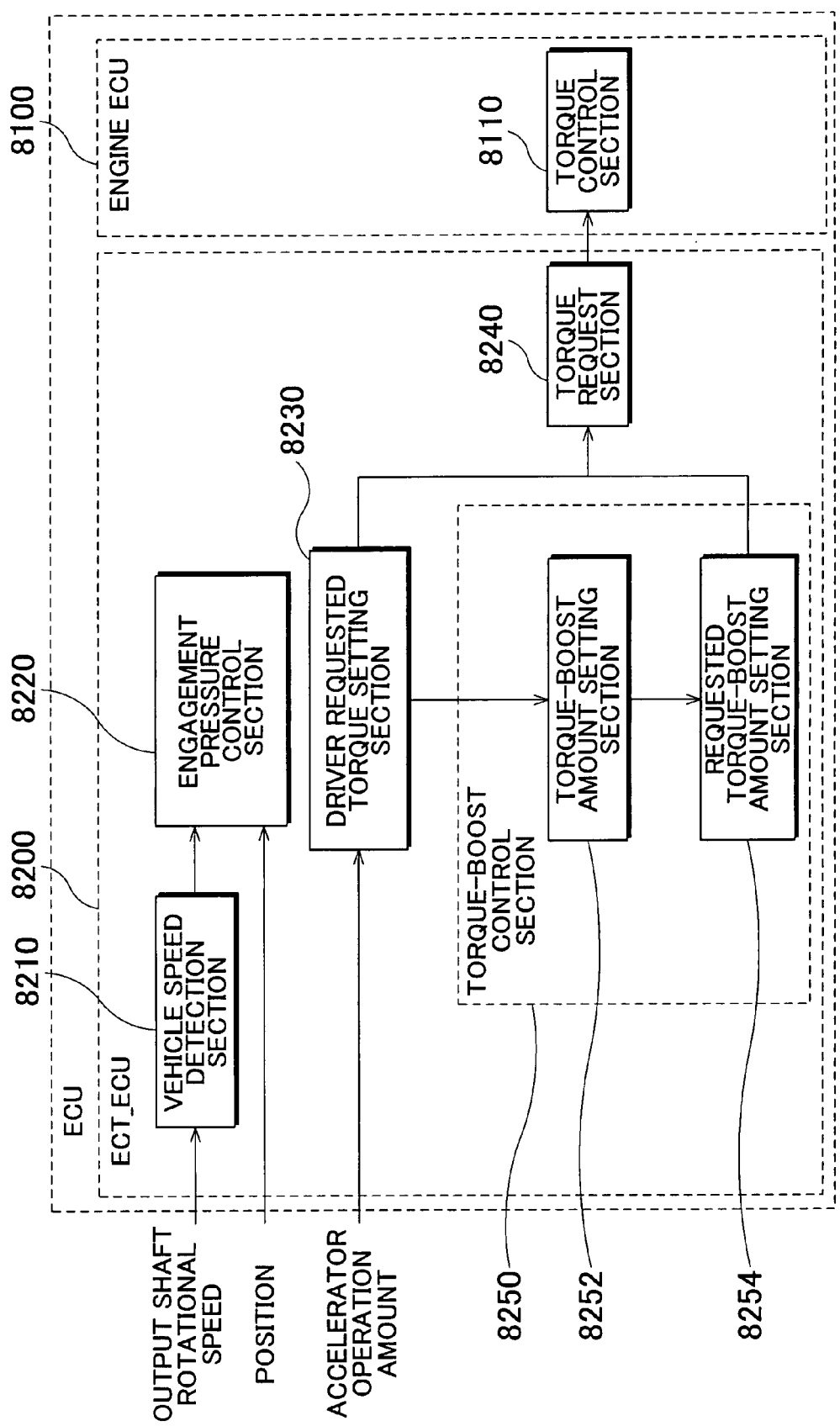
FIG. 5 is a function block diagram of an ECU.

With reference to FIG. 5, the ECU 8000 will be further described. The functions of the ECU 8000 described below may be implemented by hardware, or may also be implemented through software.

The engine ECU 8100 of the ECU 8000 includes a torque control section 8110. The torque control section 8110 receives a requested torque amount that is output from the ECT-ECU 8200, and controls the degree of throttle opening of the electronic throttle valve 8016, the ignition timing of the ignition plug, etc., so that the torque corresponding to the requested torque amount is output from the engine 1000. In the embodiment, the execution of a torque-boost control described below controls the degree of throttle opening in the increasing direction.

The ECT-ECU 8200 of the ECU 8000 includes a vehicle speed detection section 8210, an engagement pressure control section 8220, a driver requested torque setting section 8230, a torque request section 8240, and a torque-boost control section 8250.

The vehicle speed detection section 8210 calculates (detects) the vehicle speed from the output shaft rotational speed NO of the automatic transmission 2000. The engagement pressure control section 8220 controls the engagement pressures of the B1 brake 3610, the B2 brake 3620, the B3 brake 3630, the C1 clutch 3640 and the C2 clutch 3650 during shifting and after the end of shifting.

The driver requested torque setting section 8230 sets a driver requested torque that is a torque requested by a driver, based on the accelerator operation amount and the like. The driver requested torque is set corresponding to the accelerator operation amount so that the greater the accelerator operation amount, the larger the driver requested torque becomes.

The torque request section 8240 sets a requested torque amount that is a torque requested with respect to the engine 1000, on the basis of the driver requested torque. During steady-state travel, in which shifting is not performed, or the like, the driver requested torque is set as a requested torque amount.

The torque-boost control section 8250 executes the torque-boost control to increase the torque during the torque phase of an upshift. The torque-boost control section 8250 includes a torque-boost setting section 8252 and a requested torque-boost amount setting section 8254.

Figure 6:
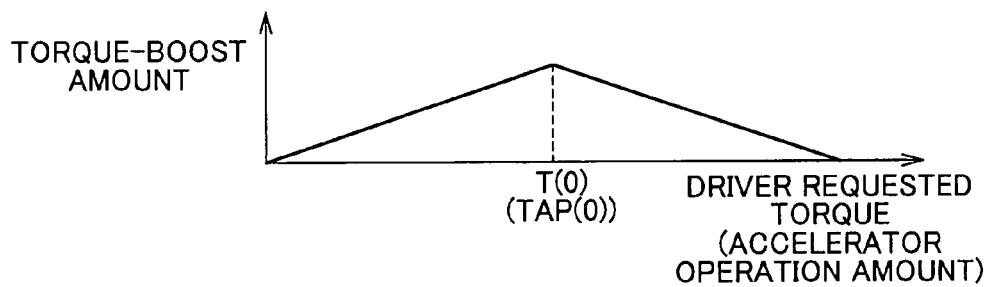
FIG. 6 is a diagram showing a relationship between the driver requested torque and the torque-boost amount.

The torque-boost setting section 8252 sets the torque-boost amount that is requested from the engine 1000 in the torque-boost control. As shown in FIG. 6, the torque-boost amount is set so that the torque-boost amount increases with the driver requested torque (accelerator operation amount) until the driver requested torque exceeds a predetermined torque T(0), that is, until the accelerator operation amount exceeds a predetermined operation amount TAP(0).

Figure 7:
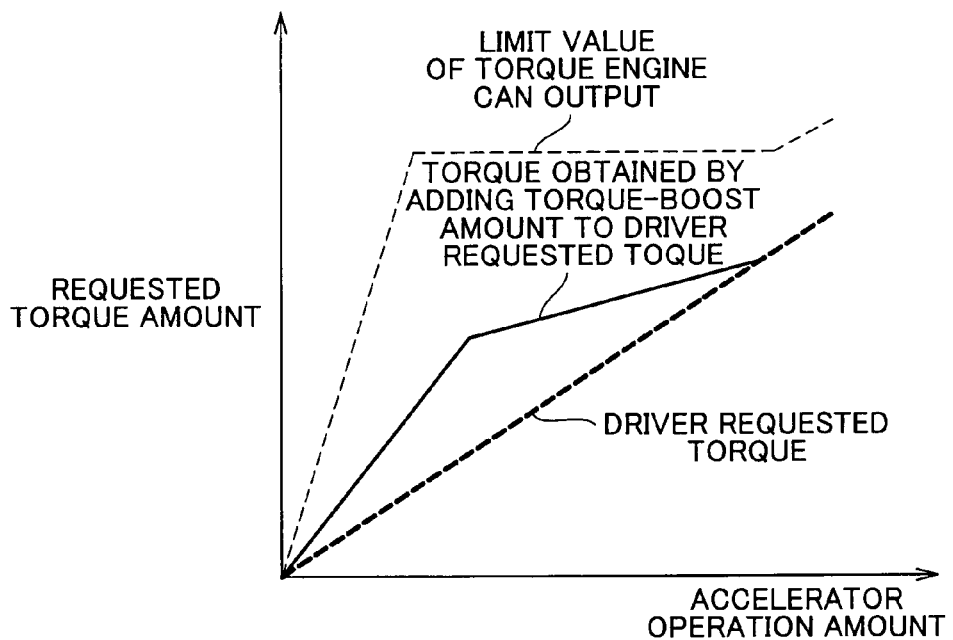
FIG. 7 is a diagram showing a relationship between the accelerator operation amount and the requested torque amount.

Then, the torque-boost amount is set so as to decrease as the driver requested torque (accelerator operation amount) becomes larger, if the driver requested torque exceeds a predetermined torque T(0), that is, if the accelerator operation amount exceeds the TAP(0). Furthermore, as shown in FIG. 7, the torque-boost amount is set so that as the accelerator operation amount increases, the torque obtained by adding the torque-boost amount to the driver requested torque increases.

Figure 8:
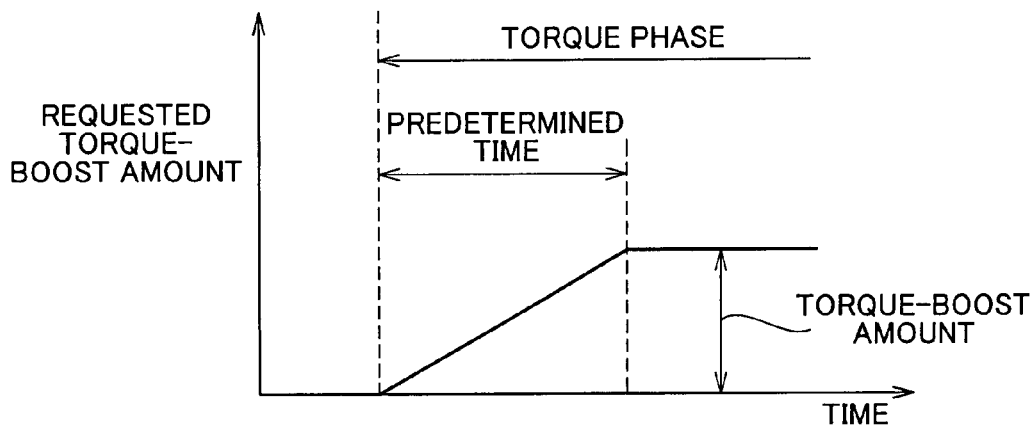
FIG. 8 is a diagram showing a relationship between the torque-boost amount and the requested torque-boost amount.

The requested torque-boost setting section 8254 sets a requested torque-boost amount by which the torque of the engine 1000 is increased. As shown in FIG. 8, the requested torque-boost amount is set so that after the torque phase of an upshift starts, the requested torque-boost amount gradually increased to a torque-boost amount in a predetermined time before an inertia phase starts. That is, the torque-boost amount is set to gradually increase to the requested torque-boost amount during the torque phase.

When the torque-boost control is executed, the torque request section 8240 sets, as a requested torque amount, a torque obtained by adding the requested torque-boost amount to the driver requested torque.

Figure 9:
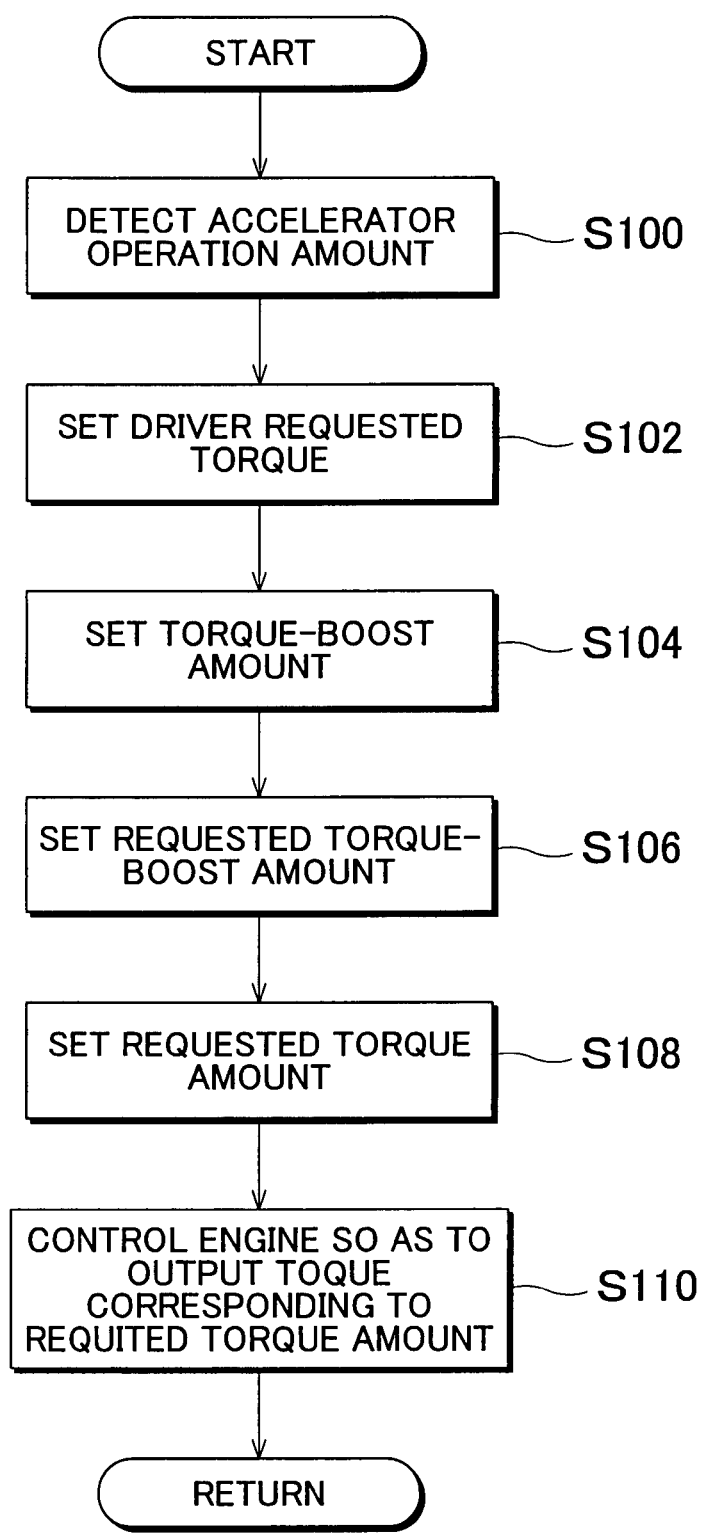
FIG. 9 is a diagram showing a control structure of a program executed by an ECU.

With reference to FIG. 9, a control structure of a program executed by the ECU 8000, that is, the controller in accordance with the embodiment, during the torque phase in the upshift will be described. The program described below is periodically executed at predetermined time intervals.

In step (hereinafter, step will be abbreviated as S) 100, the ECU 8000 detects the accelerator operation amount on the basis of the signal sent from the accelerator operation amount sensor 8010. That is, during the torque phase of the upshift, the accelerator operation amount detected in real time is used.

In S102, the ECU 8000 sets the driver requested torque on the basis of the accelerator operation amount. In S104, the ECU 8000 sets the torque-boost amount on the basis of the driver requested torque, that is, the accelerator operation amount.

In S106, the ECU 8000 sets the requested torque-boost amount so that the requested torque-boost amount gradually increases to the torque-boost amount in a predetermined time that flows the start of the torque phase and precedes the inertia phase. In S108, the ECU 8000 sets, as a requested torque amount, the torque obtained by adding the requested torque-boost amount to the driver requested torque.

In S110, the ECU 8000 controls the engine 1000 so that the engine 1000 outputs a torque that corresponds to the requested torque amount. Concretely, the degree of throttle opening of the electronic throttle valve 8016 is increased so that the engine 1000 outputs a torque that corresponds to the requested torque amount. After that, the process returns to S100.

An operation of the ECU 8000, the controller in accordance with the embodiment, which is based on the structure and the flowchart described above will be described.

During the torque phase of the upshift, the accelerator operation amount is detected (S100). On the basis of the detected accelerator operation amount, the driver requested torque is set (S102). On the basis of this driver requested torque, the torque-boost amount is set (S104).

The requested torque-boost amount is set so that after the torque phase starts, the requested torque-boost amount gradually increases to the torque-raise amount in a predetermined time before the inertia phase starts (S106).

The torque obtained by adding the requested torque-boost amount to the driver requested torque is set as a requested torque amount (S108). The engine 1000 is controlled to output a torque that corresponds to the requested torque amount (S110).

The operation as described above is repeatedly performed during the torque phase of the upshift. Incidentally, the amount of drop (reduction) of the drive force during the torque phase becomes larger as the shift progresses. Therefore, the torque actually output from the engine 1000 ideally increases linearly from the start of the torque phase to the start of the inertia phase, as shown by the two-dot chain line in FIG. 10.

Figure 10:
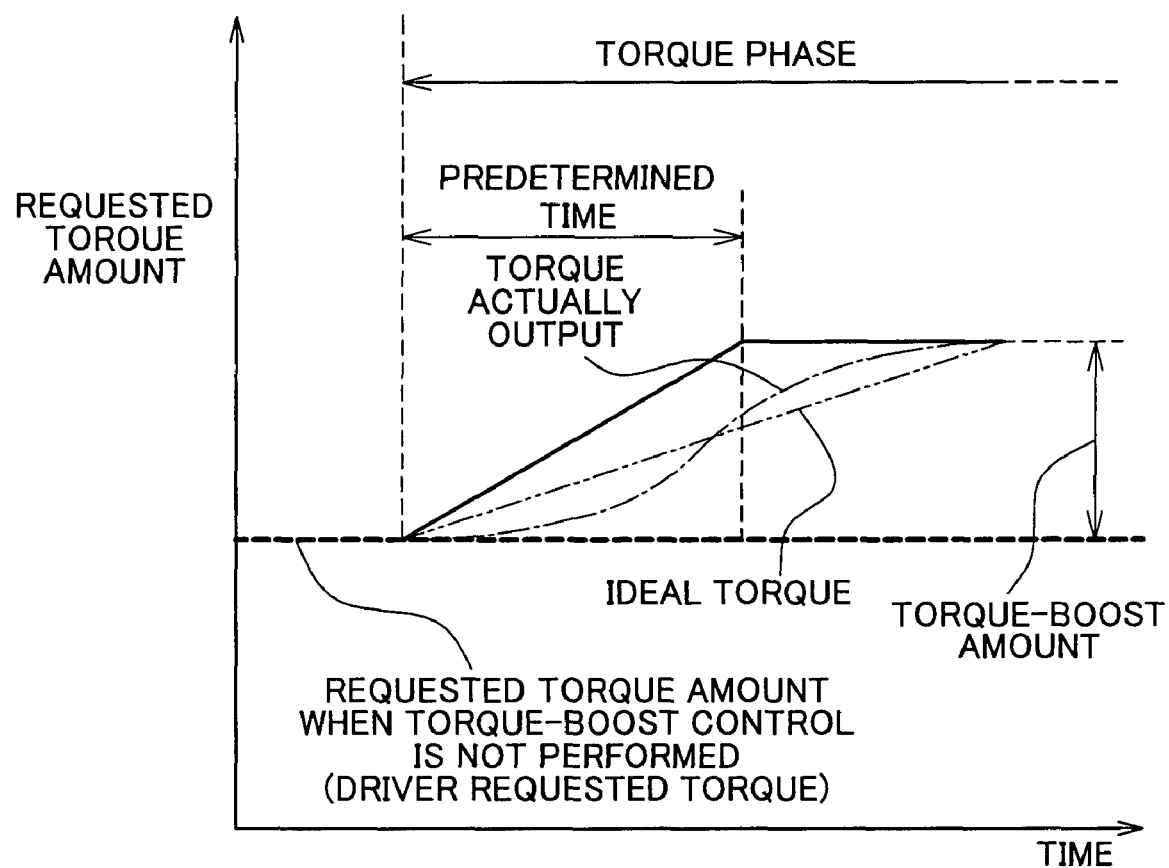
FIG. 10 is a timing chart showing changes in the requested torque amount.

However, even if the requested torque amount is set to linearly increase from the start of the torque phase to the start of the inertia phase, the torque actually output from the engine 1000 does not assume the ideal torque waveform shown by the two-dot chain line in FIG. 10, due to the operation delay of the electronic throttle valve 8016 of the engine 1000.

Therefore, in the embodiment, the requested torque-boost amount is set so as to gradually increase to the torque-boost amount in a predetermined time period that begins after the torque phase starts and that ends before the inertia phase starts. That is, the requested torque-boost amount is set so as to gradually increase to the torque-boost amount within the torque phase. Therefore, as shown by a one-dot chain line in FIG. 10, the actual torque output from the engine 1000 changes closely to an ideal torque waveform as shown by the two-dot chain line.

That is, the requested torque-boost amount is set relatively high, taking into account the response delay of the actual torque output. Thus, the torque actually output from the engine 1000 is changed closely to an ideal torque waveform. Therefore, the torque of the power source when the inertia phase starts is brought close to an ideal torque. As a result, the engagement pressures of the brakes and the clutches, and the like, which need to be controlled in accordance with the torque of the engine 1000 when the inertia phase starts, can easily be controlled.

As stated above, the torque-boost amount is set so that the torque-boost amount increases as the driver requested torque (accelerator operation amount) increases until the driver requested torque exceeds the predetermined torque T(0), that is, until the accelerator operation amount exceeds the predetermined operation amount TAP(0).

Figure 11:
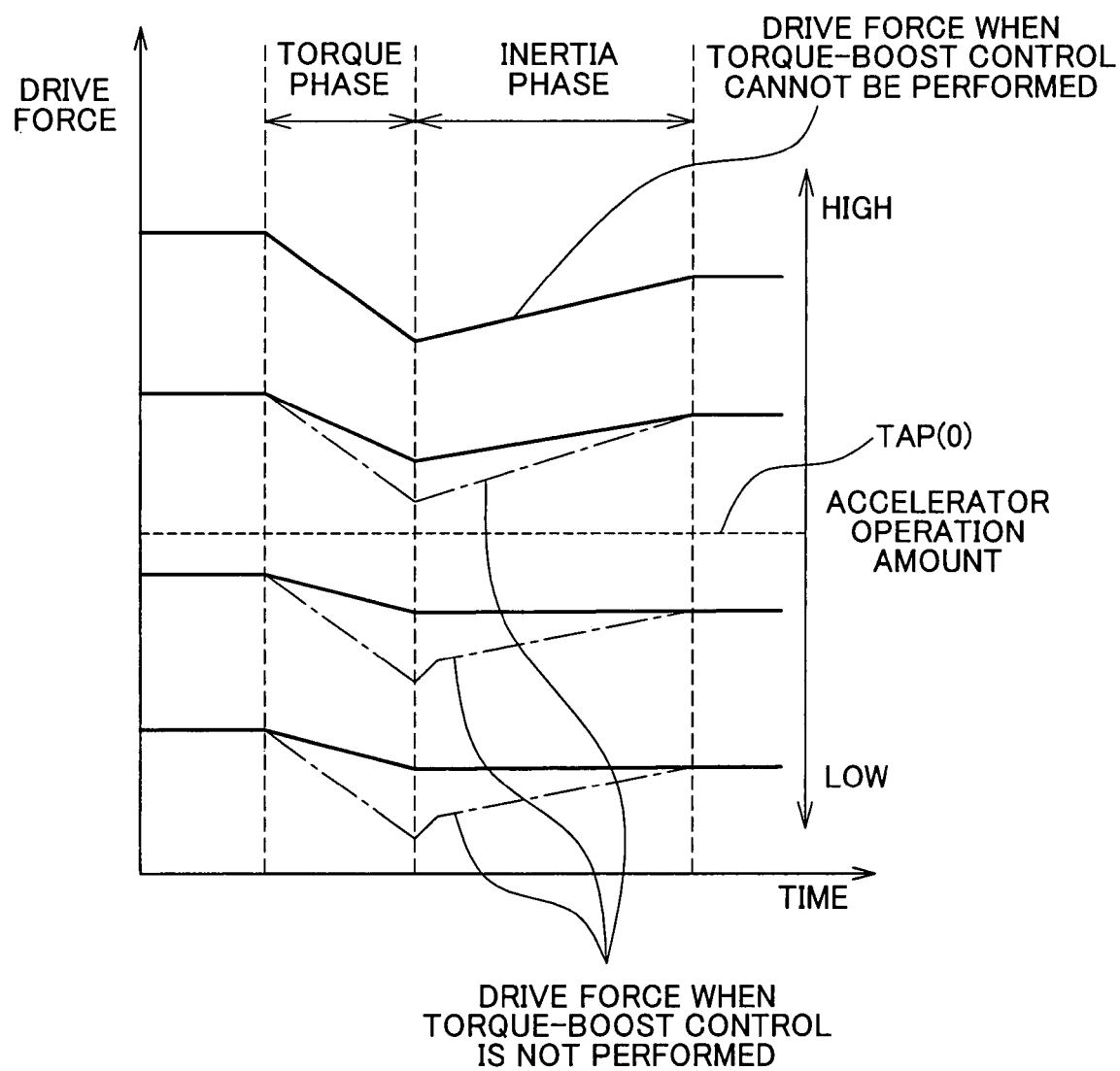
FIG. 11 is a diagram showing changes in the drive force.

Therefore, the torque-boost amount can be increases as the accelerator operation amount increases when the accelerator operation amount is low and the load of the engine 1000 is low so that sufficient torque-boost is provided, as shown in FIG. 11. Therefore, the drop of the drive force during the torque phase can be sufficiently compensated for.

The torque-boost amount is set so as to decrease as the driver requested torque (accelerator operation amount) becomes greater, if the driver requested torque exceeds the predetermined torque T(0), that is, if the accelerator operation amount exceeds the predetermined operation amount TAP(0).

Therefore, the torque-boost amount can be decreased as there approaches a state in which the accelerator operation amount is high and the load of the engine 1000 is high so that even if the degree of throttle opening is increased, the amount of intake air cannot easily be increased, that is, a state in which the torque-boost control during the torque phase cannot be performed. Therefore, the difference in drive force between when the torque-boost control is not performed and when the torque-boost control is performed can be made gradually smaller. As a result, it is possible to restrain a sudden change in the control mode, such as a sudden change in which the torque-boost control during the torque phase suddenly ceases after a certain accelerator operation amount.

The torque-boost amount is set so that the torque obtained by adding the torque-boost amount to the driver requested torque increases as the accelerator operation amount increases. Therefore, it is possible to generate greater drive force as the accelerator operation amount increases. Hence, it is possible to reduce discomfort to the driver.

As described above, according to the ECU, that is, the controller, in accordance with the embodiment, the torque-boost amount during the torque phase in the upshift is set so that the torque-boost amount increases as the driver requested torque (accelerator operation amount) increases, until the driver requested torque exceeds the predetermined torque T(0), that is, until the accelerator operation amount exceeds the operation amount TAP(0). When the driver requested torque exceeds the predetermined torque T(0), that is, if the accelerator operation amount exceeds the predetermined operation amount TAP(0), the torque-boost amount decreases as the driver requested torque (accelerator operation amount) increases. Therefore, when the accelerator operation amount is low and the load of the engine is low to provide sufficient torque-boost, the torque-boost amount is increased as the accelerator operation amount increases. Hence, the reduction in the drive force caused during the torque phase is compensated for. Furthermore, the torque-boost amount can be decreased as there approaches a state in which the accelerator operation amount is high and the load of the engine is high so that the torque-boost control during the torque phase can not be performed. Therefore, the difference in drive force between when the torque-boost control is not performed and when the torque-boost control is performed can be made gradually smaller. Hence, it is possible to minimize sudden changes in the control mode, such as a sudden change when the torque-boost of the engine abruptly ends after a certain accelerator operation amount.

Furthermore, the torque-boost amount is set so that the torque obtained by adding the torque-boost amount to the driver requested torque increases as the accelerator operation amount increases. Therefore, it is possible to generate greater drive forces as the accelerator operation amount increases. As a result, it is possible to reduce the discomfort that is caused to the driver when the transmission changes gears.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. A controller of a vehicle having a power source, and an automatic transmission, coupled to the power source, that establishes a plurality of gear steps of different gear ratios by selectively engaging a plurality of friction engagement elements, the controller comprising:

a control section that controls the power source when the automatic transmission upshift so that a torque-boost control of the power source is executed during a torque phase of the upshift; and a setting section that sets a torque-boost amount for the torque-boost control during the torque phase based on a driver requested output amount, wherein the setting section increases the torque-boost amount as the driver requested output amount increases until the requested output amount exceeds a predetermined value, when the driver requested output amount exceeds the predetermined value, the setting section decreases the torque-boost amount as the requested output amount increases, and wherein a torque obtained by adding the torque-boost amount to a requested torque, which corresponds to the driver requested output amount, is increased as the driver requested output amount increases.

2. The controller of the vehicle according to claim 1, further comprising a second setting section that sets a requested torque-boost amount so that the requested torque-boost amount for raising the torque of the power source is gradually increased to the torque-boost amount during the torque phase of the upshift.

3. A control method of a vehicle having a power source, and an automatic transmission, coupled to the power source, that establishes a plurality of gear steps of different gear ratios by selectively engaging a plurality of friction engagement elements, the control method comprising:

controlling the power source when the automatic transmission upshifts so that a torque-boost control of the power source is executed during a torque phase of the upshift; and increasing a torque-boost amount as a driver requested output amount increases in the torque-boost control until the driver requested output exceeds a predetermined value; and decreasing the torque-boost amount as the driver requested output amount increases when the driver requested output amount exceeds the predetermined value; wherein a torque obtained by adding the torque-boost amount to a requested torque, which corresponds to the driver requested output amount, is increased as the driver requested output amount increases.

* * * * *